United States Patent
Sicchio

Patent Number: 6,119,629
Date of Patent: Sep. 19, 2000

[54] CAT LITTER BOX

[76] Inventor: Gail M. Sicchio, 413 Waterford Cir., West Tarpon Springs, Fla. 34689

[21] Appl. No.: 08/709,576

[22] Filed: Sep. 9, 1996

[51] Int. Cl.[7] ................................................. A01K 29/00
[52] U.S. Cl. .......................................... 119/162; 119/165
[58] Field of Search ................................... 119/162, 165, 119/166

[56] References Cited

U.S. PATENT DOCUMENTS

| | | | |
|---|---|---|---|
| 3,949,429 | 4/1976 | Hall | 119/162 X |
| 4,030,448 | 6/1977 | Nuttall | 119/165 |
| 4,262,634 | 4/1981 | Piccone | 119/162 |
| 4,437,430 | 3/1984 | DeBardeleben | 119/162 |
| 4,862,830 | 9/1989 | Michael | 119/162 X |
| 5,216,979 | 6/1993 | Sallee et al. | 119/162 |

Primary Examiner—Michael J. Carone
Assistant Examiner—Elizabeth Shaw

[57] ABSTRACT

A simplified and easy to use cat litter box comprising an oval support member configured for attachment to the inside surface of a conventional toilet bowl, a removable tray slidably inserted through an opening in the front side of the oval support member which is configured to cover the toilet bowl opening and upon which flushable cat litter is placed during use, and stationary teeth attached to the inside front surface of the oval support member which engage the upper surface of the removable tray as it is slidably withdrawn from the front opening to empty used flushable cat litter directly into the toilet bowl for flushing.

4 Claims, 3 Drawing Sheets

CAT LITTER BOX

BACKGROUND—FIELD OF INVENTION

This invention relates to cat litter boxes and pet toilets which are attachable to a conventional toilet bowl, specifically to a simplified and easy to use cat litter box comprising an oval support member configured for attachment to the inside surface of a conventional toilet bowl, a removable tray slidably inserted through an opening in the front side of the oval support member which is configured to cover the toilet bowl opening and upon which flushable cat litter is placed during use, and stationary teeth attached to the inside front surface of the oval support member which engage the upper surface of the removable tray as it is slidably withdrawn from the front opening to empty used flushable cat litter directly into the toilet bowl for flushing.

BACKGROUND—DESCRIPTION OF PRIOR ART

Indoor cats can easily be trained to use litter boxes for depositing urine and feces. They are a convenience to pet owners but can become malodorous with repeated use, unless frequently cleaned. Many pet owners dislike the task of cleaning a cat litter box and look for ways to make the task faster and more efficiently accomplished. It is known to have cat litter boxes which are used with, or are emptied into, a conventional toilet bowl. It is also known to have animal training devices which teach pets to use a conventional toilet bowl in lieu of a cat litter box. Many such devices are elaborate and provide a structure for placement over the toilet bowl which comprise steps and trap doors, and which can be responsive to the weight of the animal for initiation of timers to flush the toilet and introduce sanitizing fluids. The inventions disclosed in U.S. Pat. No. 4,748,700 to Wooten (1988), U.S. Pat. No. 5,117,780 to Wooten (1992), and U.S. Pat. No. 4,231,321 to Cohen (1980) comprise variations of such elaborate and complex systems. Other inventions disclose a toilet seat device for attachment to the upper surface of a conventional toilet bowl which permits dual use of the toilet bowl by humans and pets. One such dual use device is disclosed in U.S. Pat. No. 5,458,089 to Rymer (1995) and comprises retractable shelf segments which are biased to reduce the central aperture of a toilet seat for pets and are retractable in response to the weight of a human. Another device for dual use by humans and pets is disclosed in U.S. Pat. No. 3,949,429 to Hall (1976). The Hall device is shallow and oval-shaped, and snap-fits over the upper surface of a conventional toilet bowl, allowing a conventional toilet seat to be placed over it for human use. The Hall device has a small opening in its rear portion which allows normal flushing of the toilet bowl to evacuate wastes therethrough. One disadvantage of the Hall invention is its shallow configuration which could produce unsanitary conditions for human use.

The prior art known to be most closely related to the present invention in function or in configuration are the inventions disclosed in U.S. Pat. No. 5,103,772 to Schmid (1992), U.S. Pat. No. 5,216,979 to Sallee (1993), U.S. Pat. No. 4,862,830 to Michael (1989), U.S. Pat. No. 2,584,656 to Anderson (1952), and U.S. Pat. No. 2,053,594 to Albert (1936). The Schmid invention comprises a pet seat with a separable container mounted beneath it with pins and guide tracks, the pet seat being configured for placement over the rim of a conventional toilet bowl. It is contemplated for the pet seat to be used by pets on a flat surface with its separable container in a closed position. Then when urine and feces are caught by the separable container, the pet seat can be placed onto the rim of the toilet bowl and its separable container opened to allow the urine and pet feces to enter the toilet bowl. In contrast, the present invention is simpler in design and less complex to use.

The Sallee invention comprises a portable cat litter box with a trap door in its bottom surface for directly placing litter into a toilet bowl. A pull-member, located through the front surface of the Sallee invention, is connected to the trap door. Trap door opening and closing is achieved by use of a slotted cam guide structure. In contrast the present invention is also simpler in and less complex to use than the Sallee invention. The Albert invention comprises a training commode for pets which is also contemplated for use as a container for bathing pets. The Albert invention is oval-shaped, has a rear aperture for drainage, and is mountable either on a separate container or directly onto a conventional toilet bowl. One disadvantage of the Albert invention is that the upper surface of the Albert commode cannot be rinsed by the water flushing the toilet and must be separately rinsed. In contrast, the present invention allows complete removal of urine and feces in one easy, automatic scraping step.

The Anderson invention is similar to the Albert invention, having an elongated receptacle mountable on the upper rim of a conventional toilet bowl with a substantial opening through its rear surface for dropping pet feces directly into the toilet bowl. The Anderson invention further comprises an open work or grill structure through the middle portion of its bottom surface. Even with its grill, the Anderson invention must be separately rinsed as it is not positioned for rinsing by the water flushing the toilet bowl. In contrast, the present invention allows complete removal of urine and feces in one easy, automatic scraping step. The Michael invention comprises a cat litter pan having a pair of adjustable brackets for supporting it at a downwardly sloping angle over the rim of a conventional toilet bowl so that a user can use a sliding brush contained in the pan for forcing out the litter through a hinged gate in the downwardly sloping front portion of the pan. In contrast, the present invention is easier to use than the Michael invention, having teeth permanently attached to its inside front surface for automatically scraping the cat litter from its removable tray as the tray is withdrawn from its oval support member. It is not known to have a simplified and easy to use cat litter box comprising an oval support member configured for attachment to the inside surface of a conventional toilet bowl, a removable tray slidably inserted through an opening in the front side of the oval support member which is configured to cover the toilet bowl opening and upon which flushable cat litter is placed during use, and stationary teeth attached to the inside front surface of the oval support member which engage the upper surface of the removable tray as it is slidably withdrawn from the front opening to empty used flushable cat litter directly into the toilet bowl for flushing.

SUMMARY OF INVENTION—OBJECTS AND ADVANTAGES

It is the primary object of this invention to provide a cat litter box which is attachable to the upper rim of a conventional toilet bowl and which empties used flushable cat litter directly into the toilet bowl. It is also an object of this invention to provide a cat litter box which is attachable to the upper rim of a conventional toilet bowl and is simple and easy to empty. A further object of this invention is to provide a cat litter box which is attachable to the upper rim of a conventional toilet bowl and automatically scrapes cat litter into the toilet bowl. It is also an object of this invention to provide a cat litter box which is attachable to the upper rim of a conventional toilet bowl and which is easy to remove for access to the toilet bowl. A further object of this invention is to provide a cat litter box which is attachable to the upper rim of a conventional toilet bowl, but which also has a bottom configuration which allows it to be alternately placed upon a flat surface. It is also an object of this invention to provide a cat litter box which is attachable to the upper rim of a conventional toilet bowl and is easy to clean, light in weight, and leaves the inside of the toilet in a sanitary condition after pet use.

As described herein, properly manufactured and installed over the rim of a conventional toilet bowl, the present invention would provide a cat litter box which securely attaches to the upper rim of a conventional toilet bowl, has flushable cat litter positioned on a slidable tray, is simple and easy to use since it has teeth to automatically scrape flushable cat litter directly into the toilet bowl for flushing when its tray is pulled out of the front opening in its main support frame, which is light in weight and therefore easy to remove for access to the toilet bowl, quick to clean, and which leaves the toilet in a sanitary condition after pet use. The present invention has a bottom configured for use on a flat surface, as well as on the rim of a conventional toilet bowl. The present invention also has handles which attach its main support frame to the toilet bowl rim. It is contemplated for the present invention to comprise plastic materials and for its main support frame to extend upwardly beyond its tray approximately three inches for containment of sufficient quantities of cat litter for effective use.

The description herein provides preferred embodiments of the present invention but should not be construed as limiting the scope of the cat litter box invention. For example, variations in depth of the tray, the means by which to secure the oval support member to the rim of the toilet, the configuration of the handle used to withdraw the tray from its position above the toilet bowl, and the number and configuration of the teeth used for scraping the tray during its withdrawal, other than those shown and described herein, may be incorporated into the present invention. Thus the scope of the present invention should be determined by the appended claims and their legal equivalents, rather than the examples given.

DETAILED DESCRIPTION OF PREFERRED EMBODIMENTS

Figure 1:
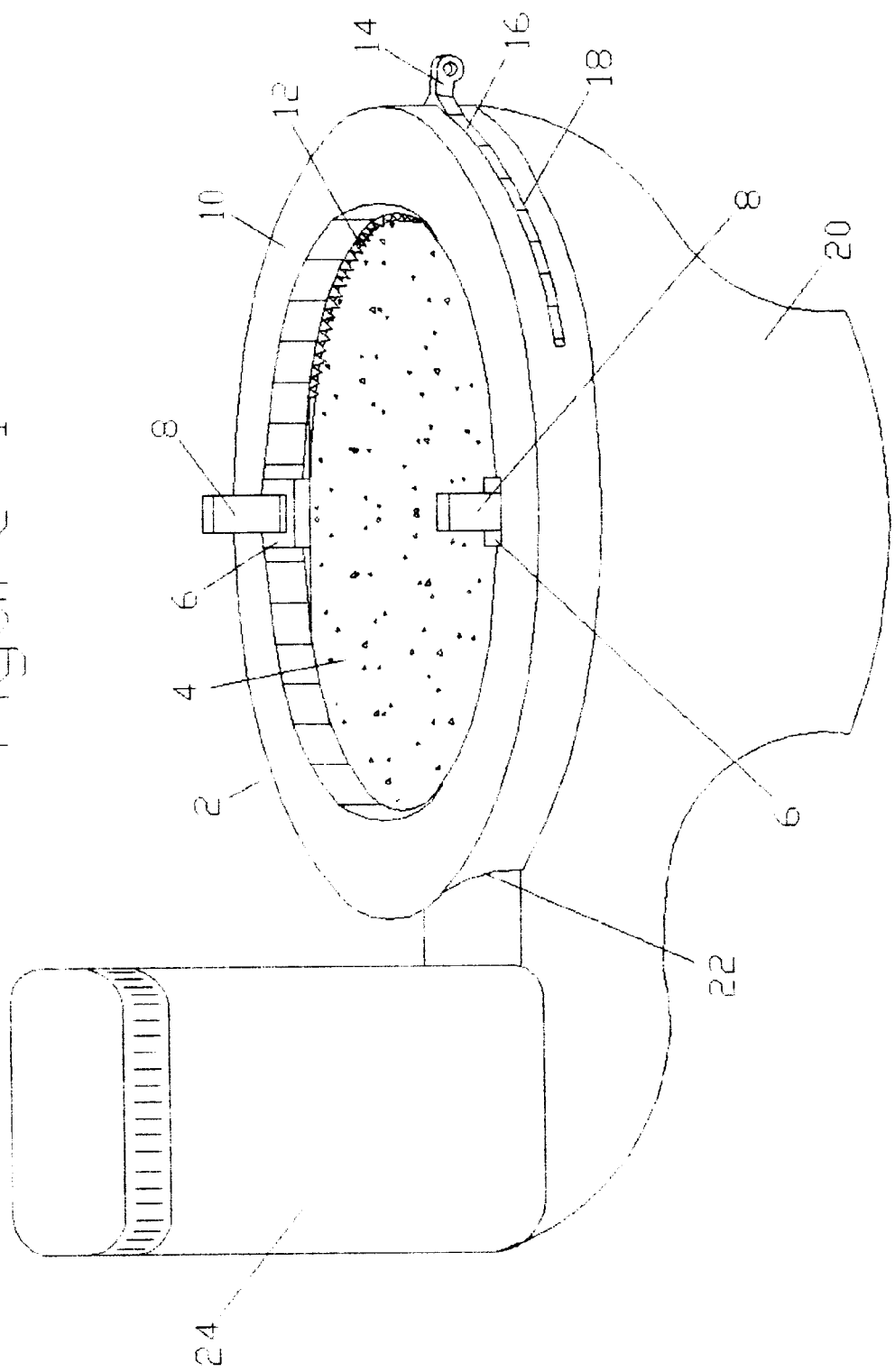
FIG. 1 is a side view of the invention attached to the upper surface of a conventional toilet bowl.

FIG. 1 shows a preferred embodiment of a cat liter box invention 2 attached to the upper rim of a conventional toilet bowl 20 which is connected to a water holding tank 24. Cat liter box invention 2 comprises an oval main support frame 10 having a centrally positioned oval cavity communicating through its upper surface, a front slot 18 horizontally positioned through the portion of main support frame 10 which is seated above toilet bowl 20, a rearward concave configuration to allow secure mounting of main support frame 10 to toilet bowl 20, and an oval tray 16 positioned through front slot 18 configured to completely block the central opening and to support flushable cat litter 4 distributed upon its upper surface. FIG. 1 shows tray 16 having a tray handle 14 extending beyond the front perimeter of main support frame 10. In addition, FIG. 1 shows a plurality of teeth 12 on the front lower interior portion of main support frame 10 positioned immediately above tray 16 for automatic scraping of flushable cat litter 4 which has been used from the top surface of tray 16 as tray 16 is pulled by tray handle 14 for withdrawal from front slot 18. FIG. 1 also shows cat litter box invention 2 having a handle 8 positioned on each side of main support frame 10 and extending above the upper surface of main support frame 10. Each handle 8 is shown attached to a gripping member 6 which connects main support frame 10 securely to toilet bowl 20 during removal of tray 16 from front slot 18.

Figure 2:
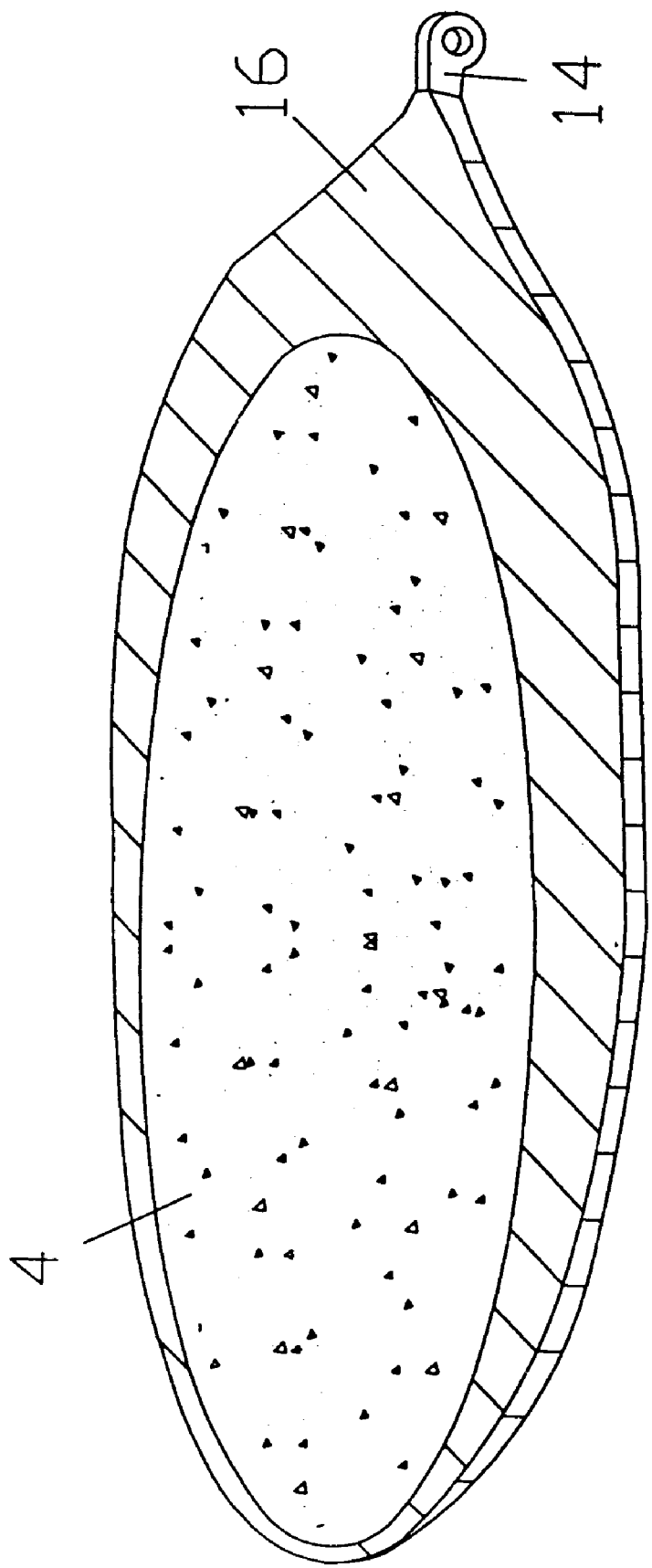
FIG. 2 is a side view of the tray of the invention.
Figure 3:
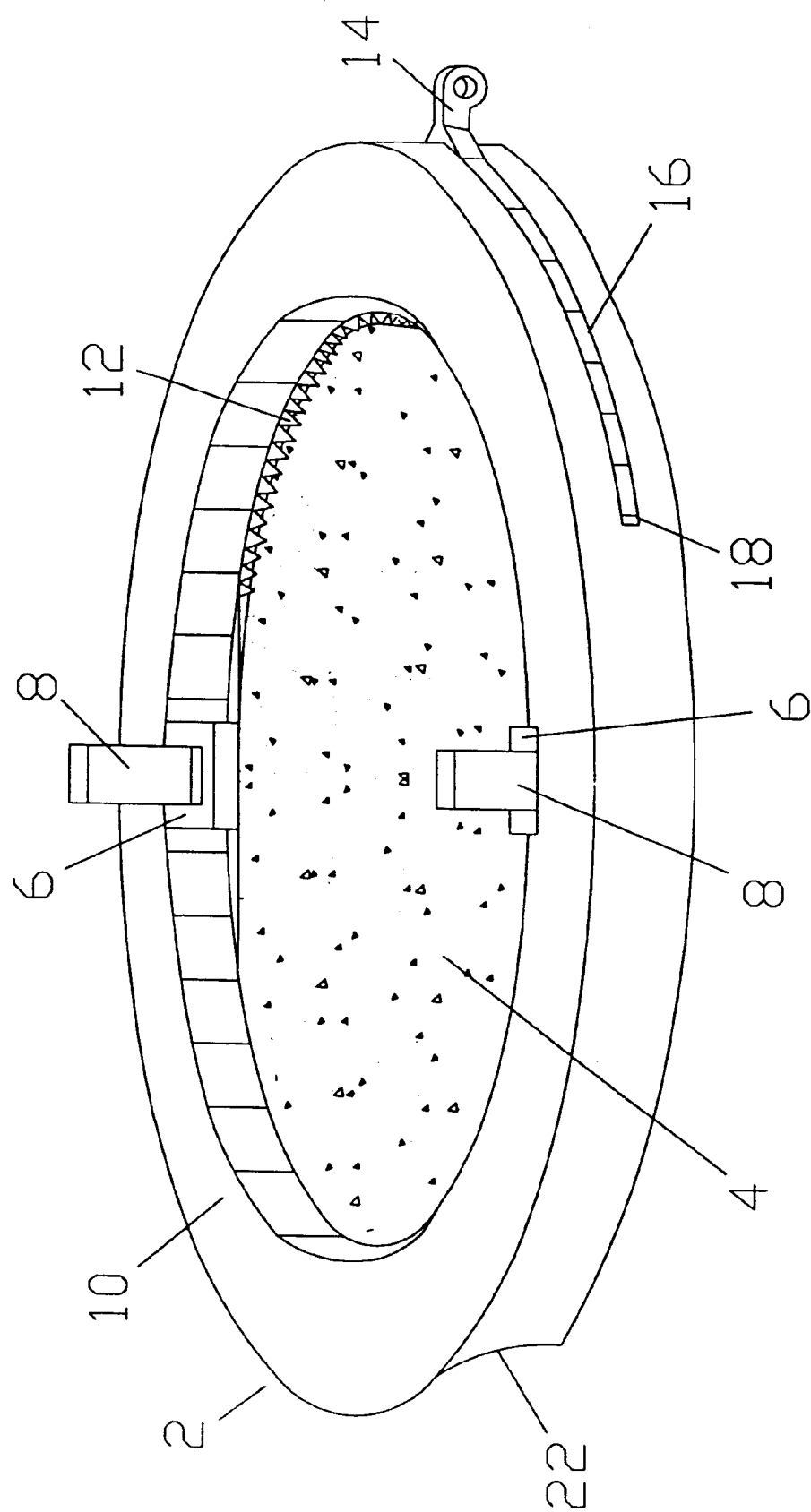
FIG. 3 is a side view of the invention.

FIG. 2 shows the oval planar configuration of tray 16 having tray handle 14 positioned on one of its ends and having cat litter 4 distributed on its upper surface. FIG. 3 shows tray 16 positioned within horizontal slot 18 with tray handle 14 extending beyond the front of main support frame 10. FIG. 3 shows main support frame 10 having an oval shaped central opening through its upper surface, a rearward concave configuration to allow secure mounting of main support frame 10 to toilet bowl 20, a plurality of teeth 12 on the front lower interior portion of main support frame 10 positioned immediately above tray, handles 8 positioned on either side of main support frame 10 and extending above the upper surface of main support frame 10, and gripping members 6 connected to each handle 8 for securely attaching main support frame 10 to toilet bowl 20 during use. FIG. 3 also shows the flat bottomed configuration of main support frame 10 which allows the use of cat litter box invention 2 on flat surfaces, in addition to use while connected to the upper rim of a toilet bowl.

For use by a household pet (not shown), tray 16 is completely positioned within front slot 18 and flushable cat litter 4 is distributed upon the upper surface of tray 16. Cat litter box invention 2 is then placed upon a flat surface (not shown) or secured to the upper rim of toilet bowl 20 with gripping members 6. After use by the household pet, if not already secured to toilet bowl 20, main support frame 10 can be lifted by handles 8 and attached to the upper rim of toilet bowl 20. When cat litter box invention 2 is securely in place, as tray 16 is withdrawn from front slot 18 by tray handle 14, teeth 12 automatically scrape flushable cat litter 4, combined with pet feces and urine, from the top surface of tray 16 and directly into toilet bowl 20. Tray 16 can then be placed into front slot 18, fresh flushable cat litter 4 can be distributed on the surface of tray 16 whereby cat litter box invention 2 is ready for reuse by the household pet.

What is claimed is:

1. A cat litter box which can be secured to the upper rim of a conventional toilet bowl and which permits automatic scraping of flushable cat litter into said toilet bowl for disposal by flushing, said cat litter box comprising an oval-shaped main support frame having a front portion, an upper surface, an oval cavity communicating through said upper surface, and a horizontally positioned slot through said front portion of said main support frame, said slot having a top edge; a tray having an end and a tray handle depending from said end, said tray also having a top surface, a planar configuration which is oval, and being of sufficient dimension to block communication between said cavity and said toilet bowl when positioned fully through said slot, said tray handle being usable for moving said tray into and out of said slot; a plurality of teeth positioned on said top edge of said slot between said slot and said cavity for scraping said flushable cat litter from said top surface of said tray when said tray is moved out of said slot; said cat litter box also having a pair of handles connected to said main support frame and extending upwardly beyond said upper surface of said main support frame, and at least one gripping member associated with each of said handles, said handles for use in removing said main support frame from said toilet bowl and said gripping members for securing said main support frame to said toilet bowl so that during withdrawal of said tray from said slot all of said flushable cat litter is scraped into said toilet bowl for disposal.

2. The cat litter box of claim 1 further comprising said main support frame having a rear portion, said rear portion being concave in configuration for secure mounting of said main support frame to said toilet bowl.

3. The cat litter box of claim 1 wherein said cavity has a depth of approximately three inches.

4. The cat litter box of claim 1 wherein said main support frame has a flat bottom surface so that when said cat litter box is removed from said rim of said toilet bowl, said cat litter box may be alternately placed in a functional position on a flat surface for use by said household pet.

* * * * *